US012722300B2

(12) United States Patent
Fujioka et al.

(10) Patent No.: US 12,722,300 B2
(45) Date of Patent: Sep. 1, 2026

(54) ROBOT SYSTEM WITH A TORQUE SENSOR

(71) Applicant: FANUC CORPORATION, Yamanashi (JP)

(72) Inventors: Naoki Fujioka, Yamanashi (JP); Kazuki Wakabayashi, Yamanashi (JP); Keita Suyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 120 days.

(21) Appl. No.: 18/567,152

(22) PCT Filed: Jul. 28, 2021

(86) PCT No.: PCT/JP2021/027965
§ 371 (c)(1),
(2) Date: Dec. 5, 2023

(87) PCT Pub. No.: WO2023/007634
PCT Pub. Date: Feb. 2, 2023

(65) Prior Publication Data
US 2024/0278428 A1 Aug. 22, 2024

(51) Int. Cl.
*B25J 9/00* (2006.01)
*B25J 9/10* (2006.01)
(Continued)

(52) U.S. Cl.
CPC ............. *B25J 9/1674* (2013.01); *B25J 9/102* (2013.01); *B25J 9/163* (2013.01); *B25J 9/1653* (2013.01); *B25J 13/085* (2013.01); *B25J 13/087* (2013.01)

(58) Field of Classification Search
CPC . B25J 9/1674; B25J 9/102; B25J 9/163; B25J 9/1653; B25J 13/085; B25J 13/087;
(Continued)

(56) References Cited

U.S. PATENT DOCUMENTS 5,293,107 A * 3/1994 Akeel ..................... F16D 55/02 310/83
5,459,925 A * 10/1995 Akeel ...................... B25J 9/102 475/344
(Continued)

FOREIGN PATENT DOCUMENTS

CN 104537244 A * 4/2015
CN 110662636 A 1/2020
(Continued)

OTHER PUBLICATIONS

JP2021058953A (Year: 2021).*
(Continued)

*Primary Examiner* — Ramon A. Mercado
*Assistant Examiner* — Shaheda Hoque
(74) *Attorney, Agent, or Firm* — Maier & Maier, PLLC

(57) ABSTRACT

A robot system includes a robot that includes one or more joints, and a determination unit that is connected to the robot. The joints each include a motor, a speed reduction mechanism that reduces a speed of revolution of the motor; and a torque sensor capable of measuring an output torque of the speed reduction mechanism. The speed reduction mechanism includes a plurality of speed-reduction elements each of which reduces the speed of revolution of the motor at a predetermined reduction ratio. The determination unit calculates time-series data about an input torque to the speed reduction mechanism, and determines the speed reduction mechanism that has a problem, on the basis of time-series data about the number of revolutions of the motor, the calculated time-series data about the input torque, time-series data about the output torque measured by the torque sensor, and the reduction ratio of each of the speed-reduction elements.

11 Claims, 16 Drawing Sheets

(51) Int. Cl.
*B25J 9/16* (2006.01)
*B25J 13/08* (2006.01)

(58) Field of Classification Search
CPC . B25J 13/088; B25J 9/104; F16H 1/06; F16H 2057/018; G05B 2219/40599; G01M 13/02
See application file for complete search history.

(56) References Cited

U.S. PATENT DOCUMENTS

| | | | | |
|---|---|---|---|---|
| 6,081,754 | A * | 6/2000 | Schlemmer | B25J 9/1643 700/263 |
| 6,181,983 | B1 * | 1/2001 | Schlemmer | B25J 9/1689 700/262 |
| 10,784,762 | B1 * | 9/2020 | Grundmann | H02K 49/102 |
| 11,125,301 | B1 * | 9/2021 | Guan | F16H 49/001 |
| 11,204,931 | B1 * | 12/2021 | Du | G06F 16/2458 |
| 2005/0113973 | A1 * | 5/2005 | Endo | B25J 9/161 700/245 |
| 2008/0191654 | A1 | 8/2008 | Blanc et al. | |
| 2008/0215292 | A1 * | 9/2008 | Kato | G01M 13/028 702/183 |
| 2009/0177325 | A1 * | 7/2009 | Uebayashi | B25J 9/1633 700/260 |
| 2009/0247364 | A1 * | 10/2009 | Sano | B60T 13/746 477/197 |
| 2011/0203898 | A1 * | 8/2011 | Harashima | H02K 7/116 475/160 |
| 2014/0002064 | A1 * | 1/2014 | Kawamura | G01D 5/2046 324/207.16 |
| 2014/0074289 | A1 * | 3/2014 | Xiao | B25J 9/163 901/3 |
| 2016/0279788 | A1 * | 9/2016 | Kanaoka | B25J 13/025 |
| 2017/0087719 | A1 * | 3/2017 | Tsuchiya | G05B 19/4065 |
| 2019/0366537 | A1 * | 12/2019 | Nakajima | F16H 19/005 |
| 2019/0370683 | A1 * | 12/2019 | Metzen | G06N 20/00 |
| 2020/0101579 | A1 * | 4/2020 | Suzuki | H01L 22/26 |
| 2020/0369333 | A1 * | 11/2020 | Lavalley | B25J 11/0035 |
| 2021/0081698 | A1 * | 3/2021 | Lindeman | G06Q 30/0283 |
| 2022/0126461 | A1 * | 4/2022 | Tanaka | G01L 5/0061 |
| 2023/0142241 | A1 * | 5/2023 | Huang | F16D 65/092 180/65.6 |
| 2023/0249364 | A1 * | 8/2023 | Inoue | B25J 9/108 74/490.03 |

FOREIGN PATENT DOCUMENTS

| | | | | | |
|---|---|---|---|---|---|
| CN | 112805536 | A | | 5/2021 | |
| CN | 113950393 | B | * | 11/2023 | B25J 9/163 |
| CN | 109595302 | B | * | 3/2024 | F16H 1/28 |
| CN | 115208974 | B | * | 11/2024 | H04M 1/185 |
| JP | 2001341092 | A | * | 12/2001 | |
| JP | 2004348250 | A | * | 12/2004 | |
| JP | 2006077980 | A | * | 3/2006 | |
| JP | 2006281421 | A | | 10/2006 | |
| JP | 2008032477 | A | | 2/2008 | |
| JP | 4112594 | B2 | * | 7/2008 | G01M 13/021 |
| JP | 2012194035 | A | | 10/2012 | |
| JP | 5482699 | B2 | * | 5/2014 | |
| JP | 2015186346 | A | * | 10/2015 | |
| JP | 5927440 | B | | 6/2016 | |
| JP | 2017007023 | A | | 1/2017 | |
| JP | 6210915 | B2 | * | 10/2017 | |
| JP | 2020097078 | A | | 6/2020 | |
| JP | 2020110877 | A | | 7/2020 | |
| JP | 2020151824 | A | | 9/2020 | |
| JP | 2021009041 | A | | 1/2021 | |
| JP | 6843541 | B2 | * | 3/2021 | |
| JP | 7010374 | B2 | * | 1/2022 | B60W 50/14 |
| JP | 7267688 | B2 | * | 5/2023 | B25J 13/085 |
| JP | 7443013 | B2 | * | 3/2024 | |
| JP | 7474210 | B2 | * | 4/2024 | B25J 9/102 |
| JP | 7565587 | B2 | * | 10/2024 | B25J 13/08 |
| WO | 2015133291 | A1 | | 9/2015 | |
| WO | 2016189608 | A1 | | 12/2016 | |
| WO | 2019234788 | A1 | | 12/2019 | |
| WO | WO-2020194597 | A1 | * | 10/2020 | G01L 5/0061 |
| WO | WO-2021236858 | A1 | * | 11/2021 | B25J 9/0009 |

OTHER PUBLICATIONS

JP2006281421A (Year: 2006).*
JP2012194035A (Year: 2012).*
JP2020097078A (Year: 2020).*
JP2015186346A (Year: 2015).*

* cited by examiner

J1
5
11
10
4
A
12
9
13
3
CONTROL DEVICE 5
29
11
28
16
27
26
29a
25
15
24
22
23
13
21
20
14
18
19
17
12
10
9

11
TORQUE SENSOR
3
13
ENCODER
ROBOT CONTROL UNIT
DETERMINATION UNIT
NOTIFICATION UNIT
35
CONTROL DEVICE
33
34
SERVOMOTOR
9

FIG. 5

| | FIRST SPEED-REDUCTION ELEMENT | SECOND SPEED-REDUCTION ELEMENT | THIRD SPEED-REDUCTION ELEMENT |
|---|---|---|---|
| REDUCTION RATIO | R1 | R2 | R3 |

TORQUE SENSOR
11
DETERMINATION UNIT
34
NOTIFICATION UNIT
35
STORAGE UNIT
36
CONTROL DEVICE
ROBOT CONTROL UNIT
33
3
SERVOMOTOR
9
ENCODER
13

FIG. 14

ROBOT SYSTEM WITH A TORQUE SENSOR

TECHNICAL FIELD

The present disclosure relates to a robot system.

BACKGROUND

There are known methods for detecting an abnormality in a motor and a reducer from a torque generated by a drive current of the motor (for example, see Publication of Japanese Patent No. 5927440).

SUMMARY

According to one aspect, the present disclosure provides a robot system including: a robot that includes one or more joints; and a determination unit that is connected to the robot, wherein the joints each include a motor, a speed reduction mechanism that reduces a speed of revolution of the motor, and a torque sensor capable of measuring an output torque of the speed reduction mechanism, wherein the speed reduction mechanism includes a plurality of speed-reduction elements each of which reduces the speed of revolution of the motor at a predetermined reduction ratio, and wherein the determination unit calculates time-series data about an input torque to the speed reduction mechanism and determines the speed-reduction element that has a problem, on the basis of time-series data about the number of revolutions of the motor, the calculated time-series data about the input torque, time-series data about the output torque measured by the torque sensor, and the reduction ratio of each of the speed-reduction elements.

BRIEF DESCRIPTION OF DRAWINGS

FIG. 5 is a view for explaining reduction ratios stored in a determination unit shown in FIG. 4.

FIG. 14 is a view showing one example of a speed reduction mechanism in the robot system shown in FIG. 12, the example showing mechanism components for which loads are calculated and the positions of the loads.

DETAILED DESCRIPTION OF EMBODIMENTS

A robot system 1 according to a first embodiment of the present disclosure will be described below with reference to the drawings.

Figure 1:
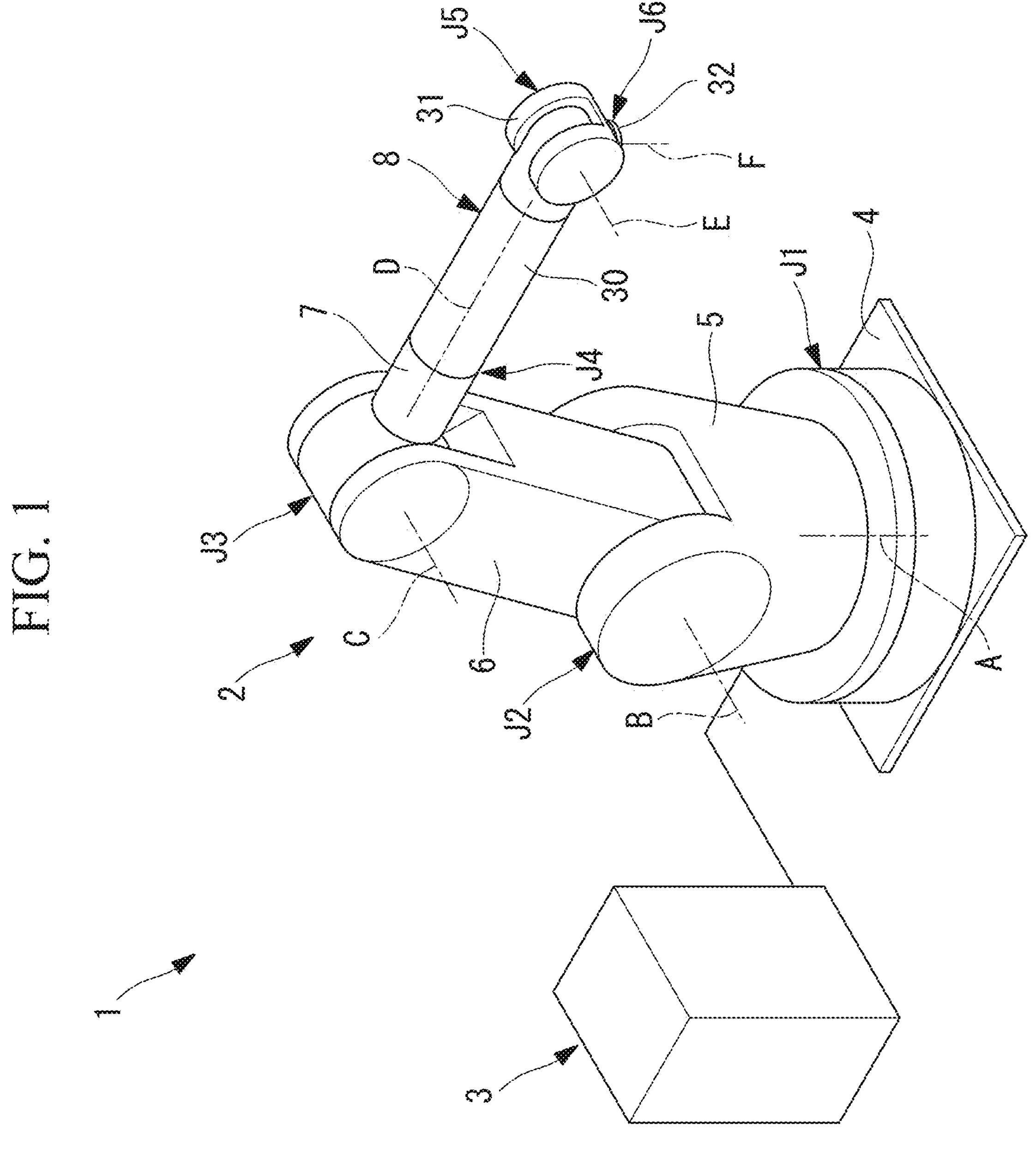
FIG. 1 is a view showing the overall configuration of a robot system according to a first embodiment of the present disclosure.

As shown in FIG. 1, the robot system 1 of this embodiment includes a robot 2 and a control device (determination unit) 3 connected to the robot 2.

The robot 2 is, for example, a vertical 6-axis articulated-type robot that includes six rotary joints (joints) J1, J2, J3, J4, J5, and J6. The robot 2 includes: a base 4 that is installed on a floor surface; and a swivel body 5 that is supported so as to be rotatable about a vertical first axis A with respect to the base 4. Furthermore, the robot 2 includes: a first arm 6 that is supported so as to be rotatable about a horizontal second axis B with respect to the swivel body 5; and a second arm 7 that is supported so as to be rotatable about a third axis C parallel to the second axis B, with respect to the first arm 6. Furthermore, the robot 2 includes a 3-axis wrist unit 8 that is mounted at a distal end of the second arm 7.

The wrist unit 8 includes: a first wrist element 30 that is supported so as to be rotatable with respect to the second arm 7 about a fourth axis D perpendicular to the third axis C; a second wrist element 31 that is supported so as to be rotatable with respect to the first wrist element 30 about a fifth axis E perpendicular to the fourth axis D; and a third wrist element 32 that is supported so as to be rotatable with respect to the second wrist element 31 about a sixth axis F perpendicular to the fourth axis D and the fifth axis E.

Figure 2:
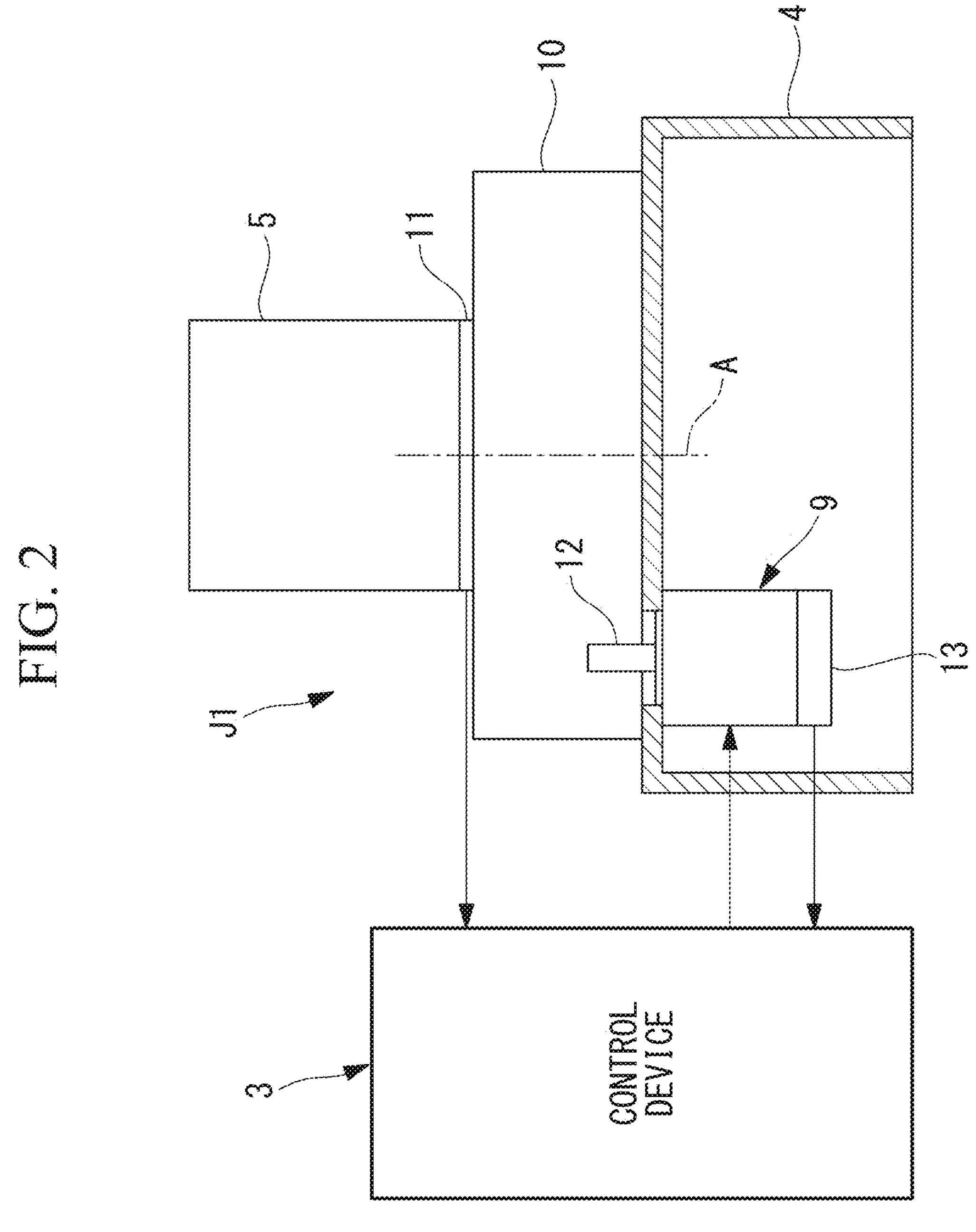
FIG. 2 is a view showing a first rotary joint of a robot and a control device in the robot system shown in FIG. 1.

As shown in FIG. 2, the first rotary joint J1 includes a pair of joint members that are formed of the base 4 and the swivel body 5 supported so as to be rotatable about the first axis A. Furthermore, the first rotary joint J1 includes a servomotor (motor) 9 that is fixed to the base 4, which is one of the joint members, and a speed reduction mechanism 10 that is disposed between the pair of joint members. Furthermore, the first rotary joint J1 includes a torque sensor 11 that is disposed between the speed reduction mechanism 10 and the swivel body 5, which is the other one of the joint members, and that can detect a torque applied to the speed reduction mechanism 10 and the swivel body 5.

The servomotor 9 includes a motor shaft 12 that is rotatably driven and an encoder 13 that detects a rotation angle of the motor shaft 12.

Figure 3:
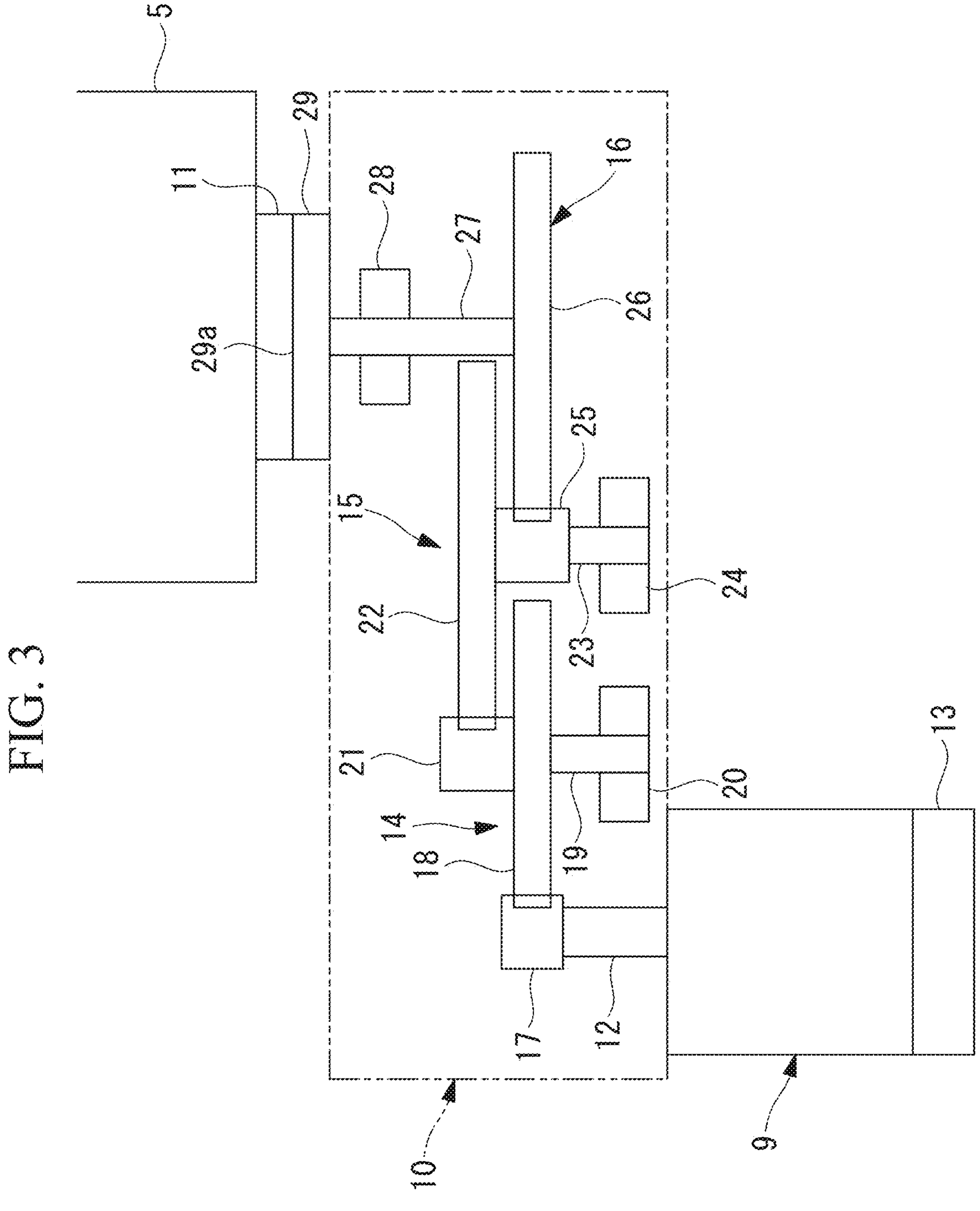
FIG. 3 is a schematic view showing one example of a speed reduction mechanism in the first rotary joint shown in FIG. 2.

The speed reduction mechanism 10 is a mechanism that reduces the speed of revolution of the motor shaft 12 and that transfers the reduced speed to the other one of the joint members, and includes a plurality of speed-reduction elements 14, 15, and 16 connected in series or parallel. Although the speed reduction mechanism 10 can have any configuration, a description will be given on the assumption that the speed reduction mechanism 10 includes three speed-reduction elements 14, 15, and 16 connected in series, as shown in FIG. 3, for example.

The first speed-reduction element (speed-reduction element) 14 includes a first gear 17 that is fixed to the motor shaft 12 of the servomotor 9, a second gear 18 that is engaged with the first gear 17, and a first bearing (bearing) 20 that supports a first shaft 19, to which the second gear 18 is fixed, so as to be able to revolve about the longitudinal axis of the first shaft 19.

The second speed-reduction element (speed-reduction element) 15 includes a third gear 21 that is fixed to the first shaft 19, a fourth gear 22 that is engaged with the third gear 21, and a second bearing (bearing) 24 that supports a second shaft 23, to which the fourth gear 22 is fixed, so as to be able to revolve about the longitudinal axis of the second shaft 23.

The third speed-reduction element (speed-reduction element) 16 includes a fifth gear 25 that is fixed to the second shaft 23, a sixth gear 26 that is engaged with the fifth gear 25, and a third bearing (bearing) 28 that supports a third shaft 27, to which the sixth gear 26 is fixed, so as to be able to revolve about the longitudinal axis of the third shaft 27. The third shaft 27 is fixed to an output flange 29 of the speed reduction mechanism 10, and the torque sensor 11 is fixed to a flange surface 29*a* of the output flange 29.

The reduction ratio between the first gear 17 and the second gear 18 is a reduction ratio R1, the reduction ratio between the third gear 21 and the fourth gear 22 is a reduction ratio R2, and the reduction ratio between the fifth gear 25 and the sixth gear 26 is a reduction ratio R3.

The number of revolutions N of the motor shaft 12 of the servomotor 9 is reduced to N/R1 by the first speed-reduction element 14, is reduced to N/(R1·R2) by the second speed-reduction element 15, and is reduced to N/(R1·R2·R3) by the third speed-reduction element 16. That is, the reduction ratio of the first speed-reduction element 14 seen from the side of the servomotor 9 is R1, the reduction ratio of the second speed-reduction element 15 seen from the side of the servomotor 9 is R1·R2, and the reduction ratio of the third speed-reduction element 16 seen from the side of the servomotor 9 is R1·R2·R3.

The second rotary joint J2 has a structure similar to the first rotary joint J1 except that a pair of joint members is formed of the swivel body 5 and the first arm 6.

The third rotary joint J3 also has a structure similar to the first rotary joint J1 except that a pair of joint members is formed of the first arm 6 and the second arm 7.

The fourth rotary joint J4 also has a structure similar to the first rotary joint J1 except that a pair of joint members is formed of the second arm 7 and the first wrist element 30.

The fifth rotary joint J5 also has a structure similar to the first rotary joint J1 except that a pair of joint members is formed of the first wrist element 30 and the second wrist element 31.

The sixth rotary joint J6 also has a structure similar to the first rotary joint J1 except that a pair of joint members is formed of the second wrist element 31 and the third wrist element 32.

Figure 4:
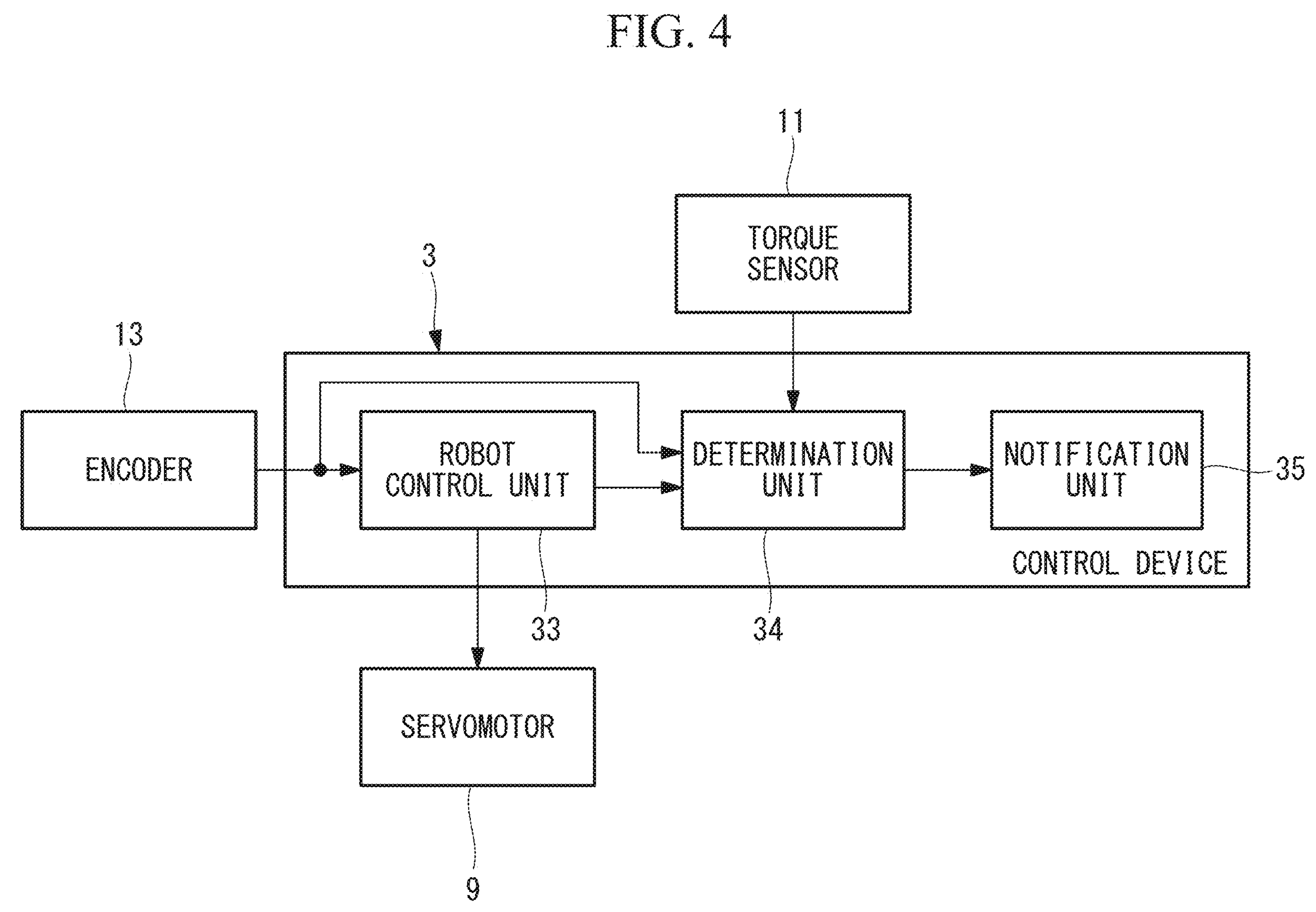
FIG. 4 is a block diagram for explaining the control device in the robot system shown in FIG. 1.

The control device 3 includes at least one processor and at least one memory. As shown in FIG. 4, the control device 3 includes: a robot control unit 33 that supplies a command current to the servomotor 9 when a rotation angle value from the encoder 13, which is included in the servomotor 9 of each of the rotary joints J1, J2, J3, J4, J5, and J6, is fed back; a determination unit 34; and a notification unit 35.

A command current value output from the robot control unit 33, the rotation angle value output from the encoder 13 of the servomotor 9, and an actual torque Ts that is an output torque detected by the torque sensor 11 are input to the determination unit 34. The determination unit 34 stores the reduction ratios R1, R2, and R3 of the speed-reduction elements 14, 15, and 16, as shown in FIG. 5. The determination unit 34 calculates an input torque input to the speed reduction mechanism 10 from the servomotor 9, on the basis of the command current value input from the robot control unit 33, and calculates an ideal torque Ti that is an ideal output torque from the speed reduction mechanism 10, from the input torque and the reduction ratios R1, R2, and R3.

Furthermore, the determination unit 34 calculates the differential torque TD1 by subtracting the actual torque Ts from the calculated ideal torque Ti. Furthermore, the determination unit 34 calculates the frequency f of a periodic component contained in the differential torque TD1 through frequency analysis of the differential torque TD1 by a known method such as FFT, for example.

The determination unit 34 compares the value N/f, which is obtained by dividing the number of revolutions N of the motor shaft 12, based on the amount of change in the rotation angle value detected by the encoder 13, by the calculated frequency f, with reduction ratios 1, R1, R1·R2, and R1·R2·R3. Then, in the case where the difference between the value N/f and any of the reduction ratios 1, R1, R1·R2, and R1·R2·R3 is equal to or less than a predetermined threshold as a result of comparison, the determination unit 34 determines that there is a possibility of a problem occurring at the corresponding speed-reduction element 14, 15, or 16.

In the case where the value N/f is approximate to the reduction ratio 1, there is a possibility of a problem occurring at the servomotor 9 or the first gear 17 of the first speed-reduction element 14, the first gear 17 being fixed to the motor shaft 12.

In the case where the value N/f is approximate to the reduction ratio R1, there is a possibility of a problem occurring at any of the second gear 18 and the third gear 21, which are fixed to the first shaft 19 of the first speed-reduction element 14.

In the case where the value N/f is approximate to the reduction ratio R1·R2, there is a possibility of a problem occurring at any of the fourth gear 22 and the fifth gear 25, which are fixed to the second shaft 23 of the second speed-reduction element 15.

In the case where the value N/f is approximate to the reduction ratio R1·R2·R3, there is a possibility of a problem occurring at the sixth gear 26, which is fixed to the third shaft 27 of the third speed-reduction element 16.

Then, the notification unit 35 notifies the determination result obtained at the determination unit 34 to the outside. The notification unit 35 may give a notification by any method, and a location that may have a problem can be notified to the outside through a display on a monitor of the control device 3, a display with a lamp, or an indication with a buzzer.

Next, a description will be given of a method for diagnosing whether a problem has occurred at the speed reduction mechanism 10 in the robot system 1 of this embodiment.

An operator manipulates the control device 3 to make the robot 2 operate. Although the operation of the robot 2 can be any operation for making all of the six rotary joints J1, J2, J3, J4, J5, and J6 simultaneously operate or making some of the six rotary joints operate, it is preferable to execute a diagnostic program for making the six rotary joints J1, J2, J3, J4, J5, and J6 operate one by one. Since diagnostic methods for the individual rotary joints J1, J2, J3, J4, J5, and J6 are the same, the diagnostic method for the first rotary joint J1 will be illustrated and described here.

Figure 6:
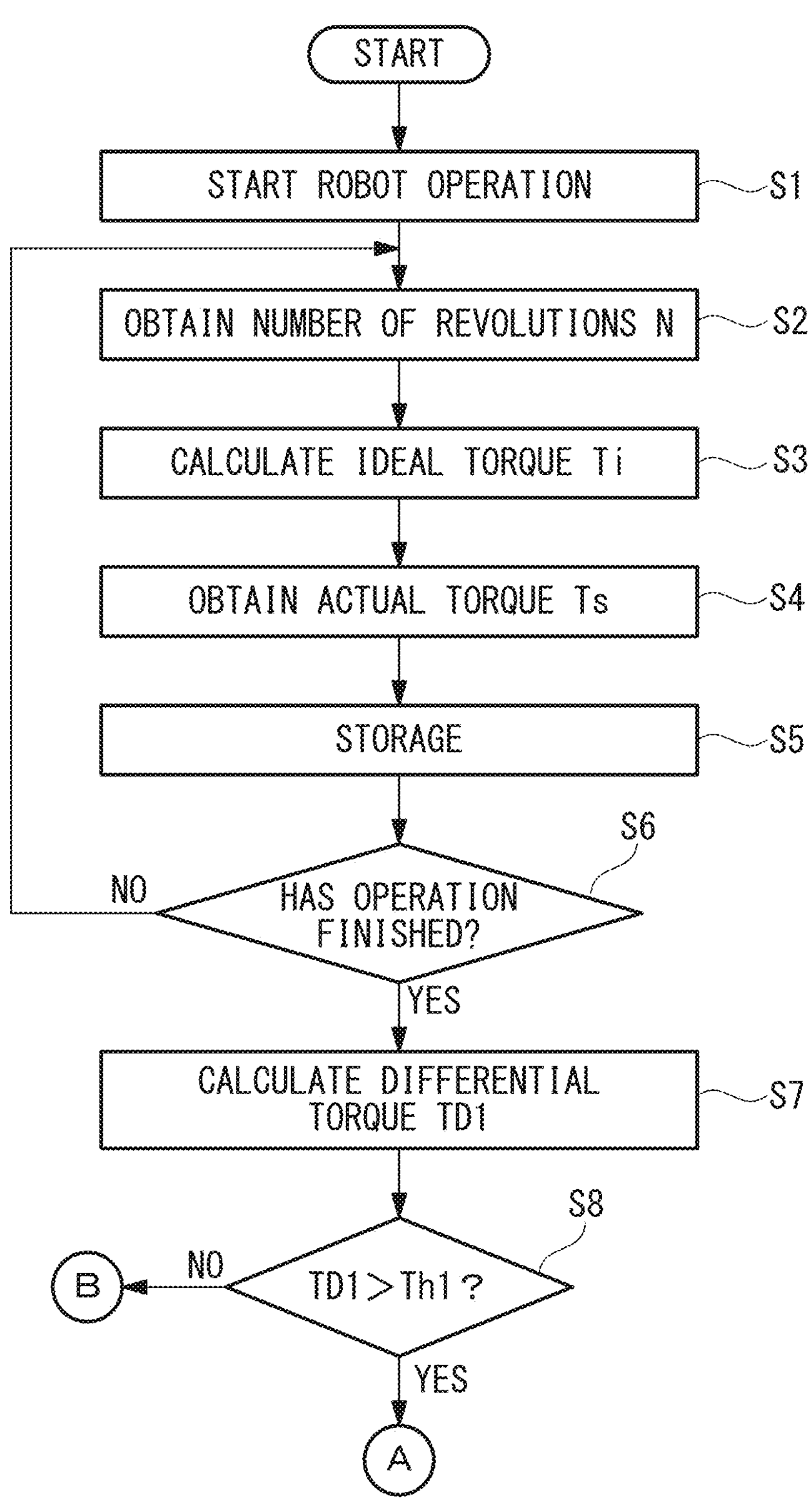
FIG. 6 is a flowchart for explaining a diagnostic method in the robot system shown in FIG. 1.

As shown in FIG. 6, the operator executes the diagnostic program, thereby starting a constant-speed operation of only the first rotary joint J1 of the robot 2 (Step S1). Accordingly, the servomotor 9 is operated by a command current value output from the robot control unit 33, and the swivel body 5 is rotatably driven about the first axis A with respect to the base 4. In this state, a rotation angle value detected by the encoder 13 of the servomotor 9 is input to the determination unit 34, and the determination unit 34 obtains the number of revolutions N of the servomotor 9 from a change of the rotation angle value over time (Step S2).

Furthermore, the command current value output from the robot control unit 33 is input to the determination unit 34, and the determination unit 34 calculates an ideal torque Ti based on the input torque of the servomotor 9 (Step S3). The ideal torque Ti is calculated by multiplying the input torque by the reduction ratio R1·R2·R3 of the entire speed reduction mechanism 10 and the transmission efficiency.

At the same time, an actual torque Ts detected by the torque sensor 11 is input to the determination unit 34 (Step S4). The obtained number of revolutions N, the calculated ideal torque Ti, and the detected actual torque Ts are stored in association with the input times of the rotation angle value, the command current value, and the actual torque Ts into the determination unit 34 (Step S5).

Figure 7:
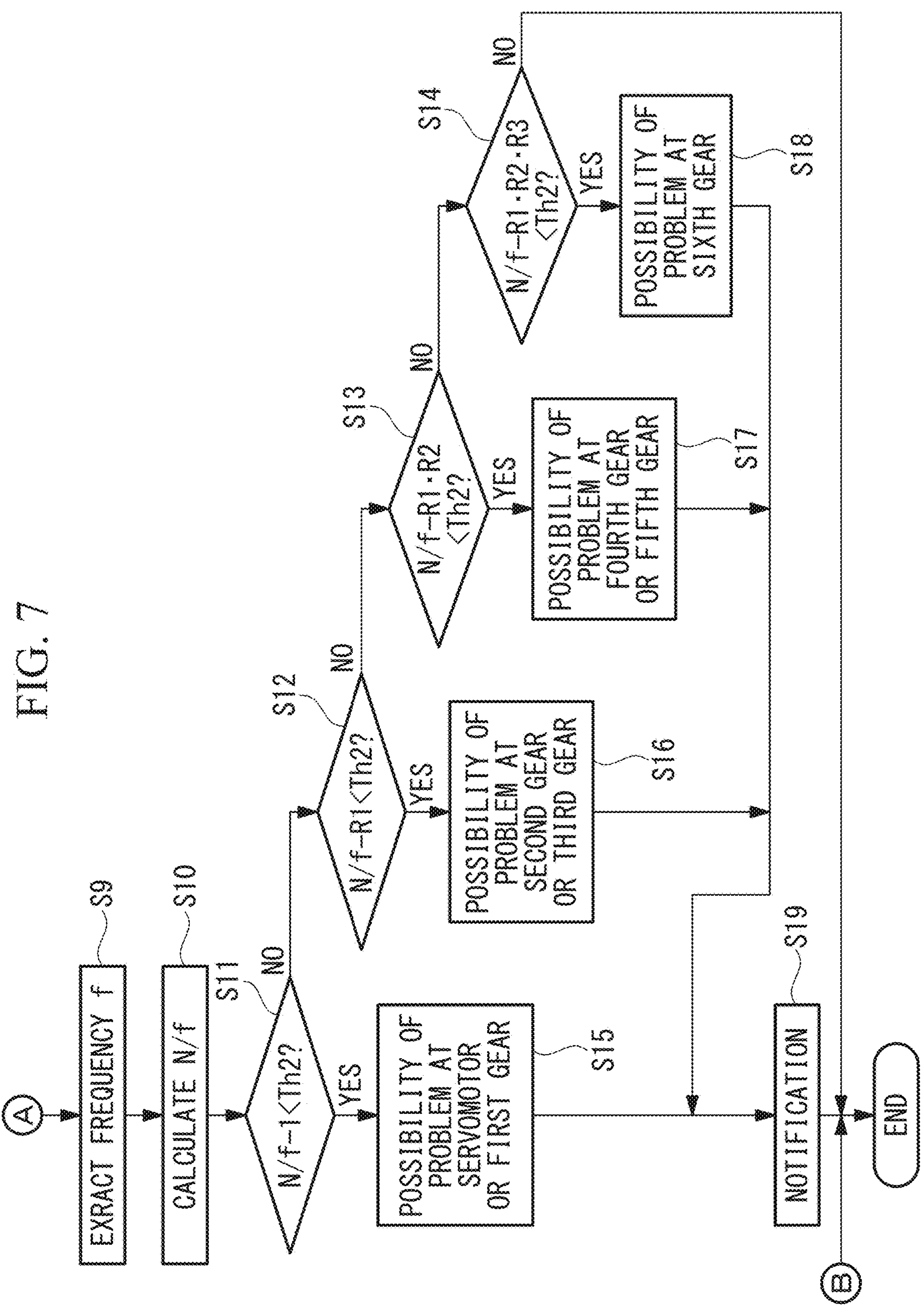
FIG. 7 is a flowchart following the flowchart shown in FIG. 6.
Figure 8:
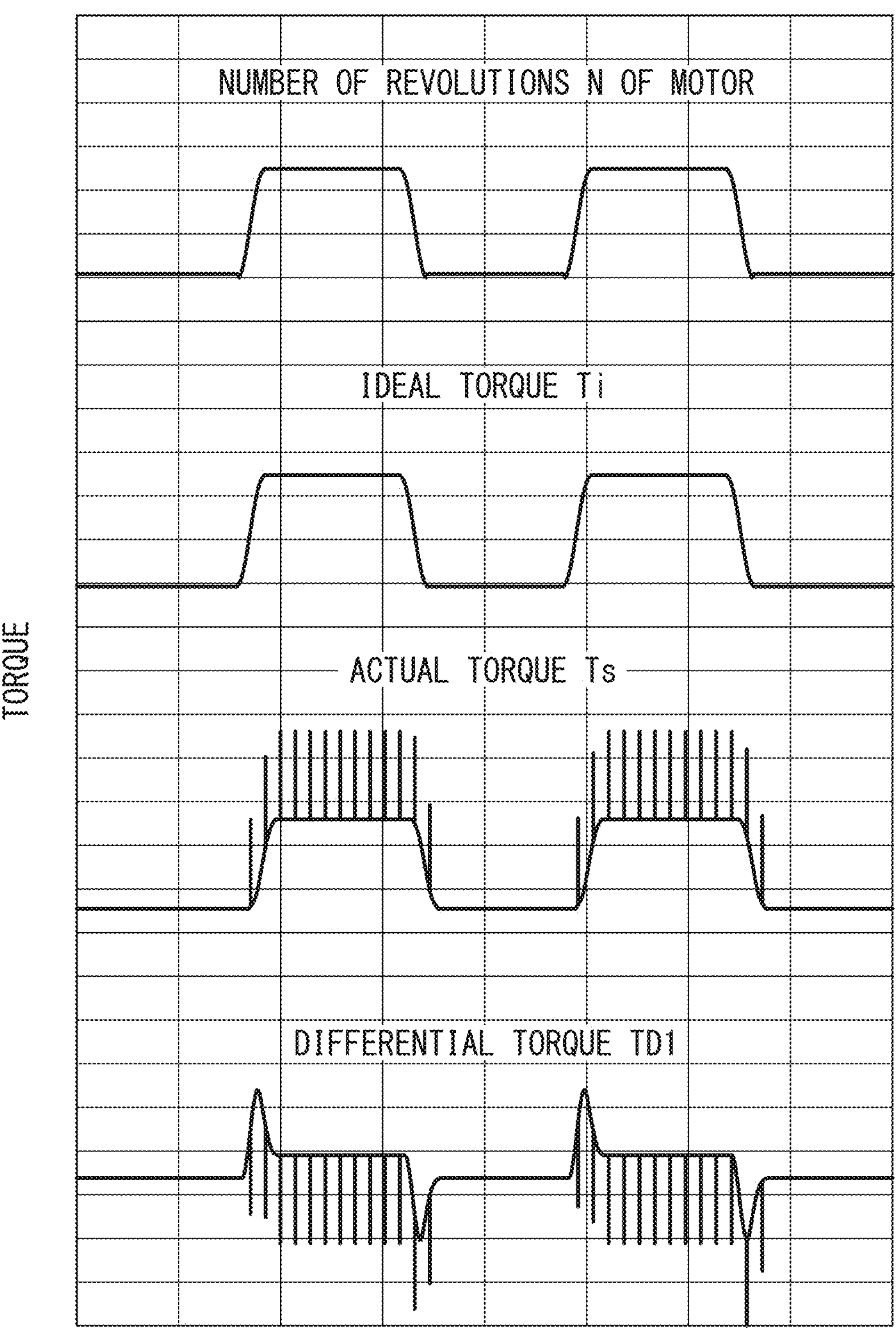
FIG. 8 is a time chart for explaining time-series data about the number of revolutions of a motor and torques, used in the diagnostic method shown in FIG. 6.

Then, it is determined whether the operation of the robot 2 has finished (Step S6). In the case where it is determined that the operation of the robot 2 has not finished, the processes from Step S2 are repeated. In a state in which it is determined in Step S6 that the operation of the robot 2 for diagnosis has finished, items of time-series data about the number of revolutions N of the servomotor 9, the ideal torque Ti, and the actual torque Ts in a predetermined time range are obtained, as shown in FIG. 8. Furthermore, as shown in FIG. 7, the time-series data about the actual torque Ts is subtracted from the time-series data about the ideal torque Ti, thereby obtaining the time-series data about the differential torque (first differential torque) TD1, shown in FIG. 8 (Step S7).

It is determined whether a differential torque TD1 that exceeds a predetermined threshold Th1 has occurred in the obtained time-series data about the differential torque TD1 (Step S8). In the case where there is a time when a differential torque TD1 that exceeds the threshold Th1 has occurred, as shown in FIG. 7, the frequency f of a periodic component contained in the time-series data about the differential torque TD1 is extracted (Step S9).

Then, the determination unit 34 calculates the value N/f by dividing the number of revolutions N of the servomotor 9 by the extracted frequency f (Step S10). The calculated value N/f is sequentially compared with the reduction ratios 1, R1, R1·R2, and R1·R2·R3 (Steps S11 to S14).

In Step S11, in the case where it is determined that the value N/f is equal to 1 (the difference between the value N/f and 1 is less than a predetermined threshold Th2), there is a possibility of a problem occurring at the servomotor 9 and the first gear 17, which revolve at the number of revolutions N (Step S15). In the case where a rotor of the servomotor 9 has any problem or a tooth of the first gear 17 breaks, the output torque fluctuates at the same frequency as the number of revolutions N. In the case where it is determined that there is a possibility of a problem, the determination result is externally reported by the notification unit 35 (Step S19).

In Step S11, in the case where it is determined that the value N/f is not equal to 1, it is determined whether the value N/f is equal to R1 (the difference between the value N/f and R1 is less than the predetermined threshold Th2) (Step S12). In Step S12, in the case where it is determined that the value N/f is equal to R1, there is a possibility of a problem occurring at the second gear 18 and the third gear 21, which are fixed to the first shaft 19 revolving at the number of revolutions N/R1 (Step S16). In this case, the determination result is externally reported by the notification unit 35 (Step S19).

Furthermore, in Step S12, in the case where it is determined that the value N/f is not equal to R1, it is determined whether the value N/f is equal to R1·R2 (the difference between the value N/f and R1·R2 is less than the predetermined threshold Th2) (Step S13). In Step S13, in the case where it is determined that the value N/f is equal to R1·R2, there is a possibility of a problem occurring at the fourth gear 22 and the fifth gear 25, which are fixed to the second shaft 23 revolving at the number of revolutions N/(R1·R2) (Step S17). In this case, the determination result is externally reported by the notification unit 35 (Step S19).

Furthermore, in Step S13, in the case where it is determined that the value N/f is not equal to R1·R2, it is determined whether the value N/f is equal to R1·R2·R3 (the difference between the value N/f and R1·R2·R3 is less than the predetermined threshold Th2) (Step S14). In Step S14, in the case where it is determined that the value N/f is equal to R1·R2·R3, there is a possibility of a problem occurring at the sixth gear 26, which is fixed to the third shaft 27 revolving at the number of revolutions N/(R1·R2·R3) (Step S18). In this case, the determination result is externally reported by the notification unit 35 (Step S19).

The threshold Th2 used in Steps S11 to S14 may be identical or different.

After the diagnosis on the first rotary joint J1 is finished, the diagnosis should be sequentially performed on the second rotary joint J2 to the sixth rotary joint J6.

In this way, according to the robot system 1 of this embodiment, there is an advantage in that it is possible to identify, not a problem at the entire speed reduction mechanism 10, but the cause of a fault inside the speed reduction mechanism 10, that is, a problem at each of the speed-reduction elements 14, 15, and 16, which are included inside the speed reduction mechanism 10. Accordingly, without removing the entire speed reduction mechanism 10 to perform investigation again or replacing the entire speed reduction mechanism 10, it is possible to replace the speed-reduction element 14, 15, or 16 at which the problem has been identified, thus allowing a reduction of the number of replacement parts to a minimum and a significant reduction of the man-hours and the costs required for maintenance.

Note that, in this embodiment, although it is determined whether there is a problem at any of the servomotor 9 and the first to sixth gears 17, 18, 21, 22, 25, and 26, which are included in the speed-reduction elements 14, 15, and 16, it is also possible to similarly make a determination in the case where there is a problem at the other mechanical elements. For example, in the case where there is a problem at the first bearing 20, which supports the first shaft 19, since it is conceivable that the output torque oscillates at the same frequency as or a frequency approximate to the number of revolutions N/R1, a determination of a problem may be similarly made.

Furthermore, in the case where there is a problem at the second bearing 24, which supports the second shaft 23, since it is conceivable that the output torque oscillates at the same frequency as or a frequency approximate to the number of revolutions N/R1·R2, a determination of a problem may be similarly made.

Furthermore, in the case where there is a problem at the third bearing 28, which supports the third shaft 27, since it is conceivable that the output torque oscillates at the same frequency as or a frequency approximate to the number of revolutions N/R1·R2·R3, a determination of a problem may be similarly made.

Next, a robot system according to a second embodiment of the present invention will be described below with reference to the drawings.

In the description of this embodiment, identical reference signs are assigned to portions that have the configurations common to those of the robot system 1 of the above-described first embodiment, and a description thereof will be omitted.

Figure 9:
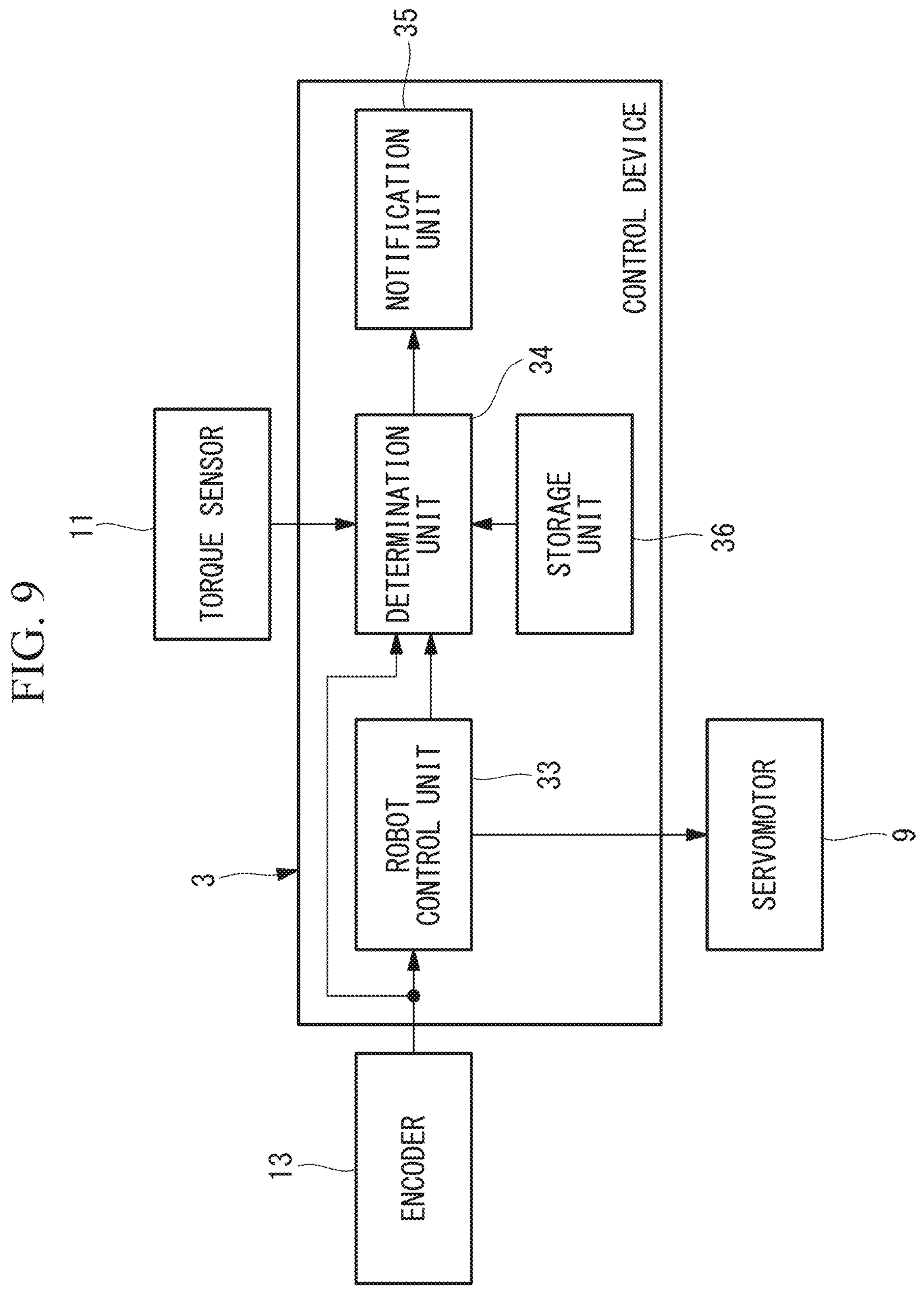
FIG. 9 is a block diagram for explaining a control device of a robot system according to a second embodiment of the present disclosure.

As shown in FIG. 9, in the robot system of this embodiment, the control device 3 includes a storage unit 36 that stores time-series data about a reference torque TR. The reference torque TR is the differential torque between an ideal torque Ti and an actual torque Ts in a normal state of the robot 2, the differential torque being obtained at the time of shipment of the robot 2 or other opportunities. For example, at the time of shipment of the robot 2 or other opportunities, time-series data about the differential torque TD1, which is obtained by executing the processes up to Step S7 of FIG. 6, should be stored in the storage unit 36.

Figure 10:
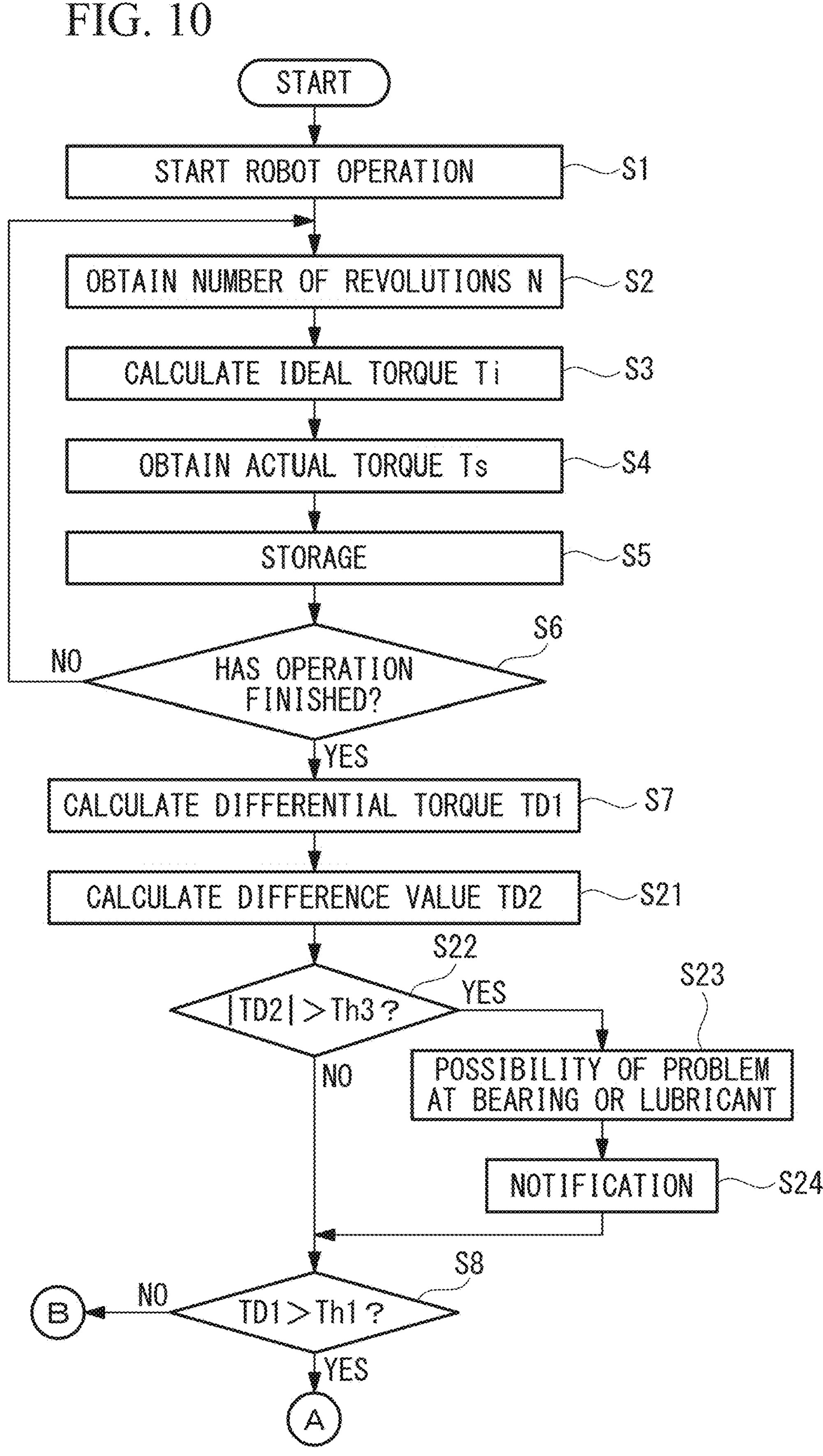
FIG. 10 is a flowchart for explaining a diagnostic method in the robot system shown in FIG. 9.
Figure 11:
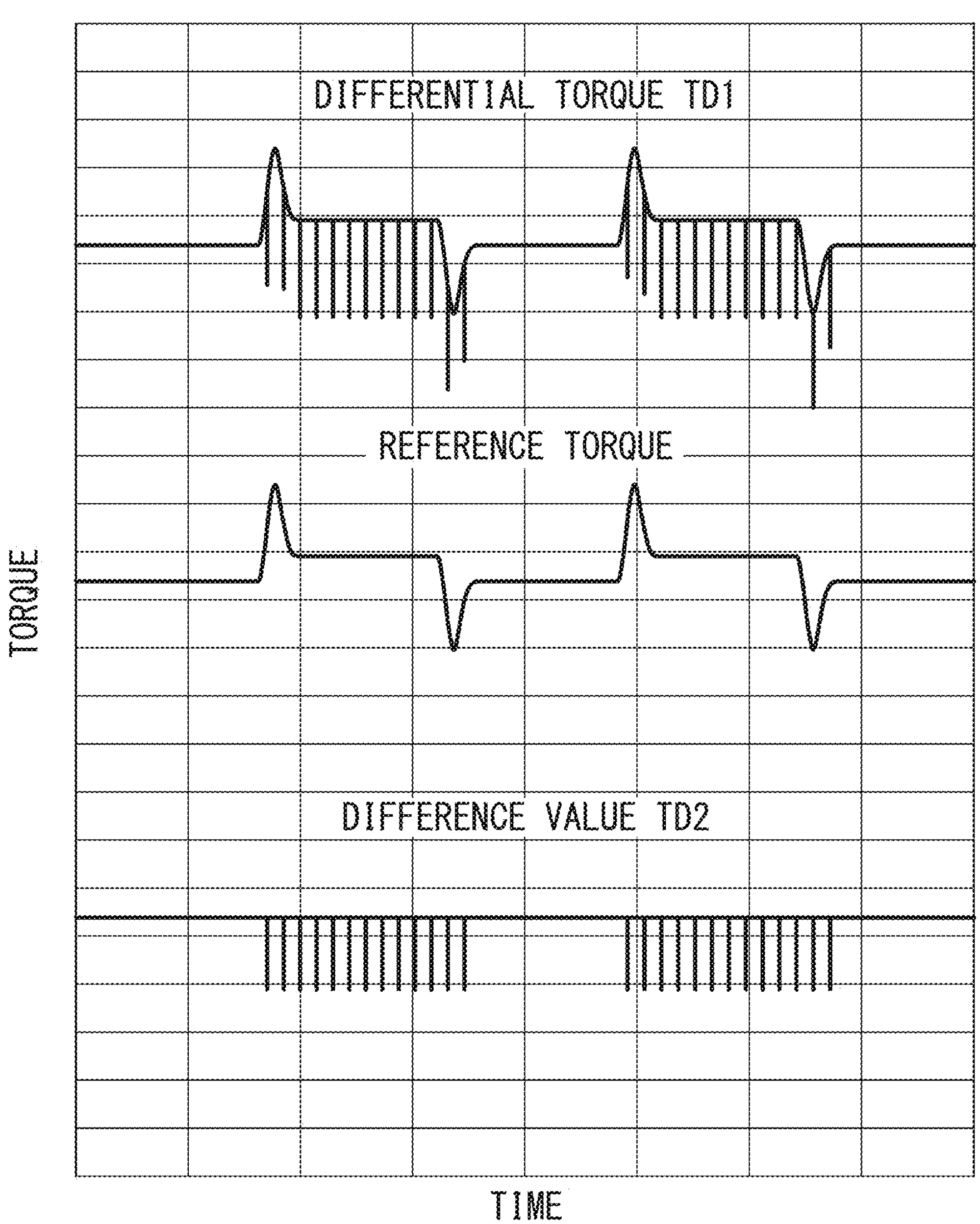
FIG. 11 is a time chart for explaining time-series data about torques, used in the diagnostic method shown in FIG. 10.

In the robot system of this embodiment, the determination unit 34 subtracts, from the time-series data about the calculated differential torque TD1, the time-series data about the reference torque TR read from the storage unit 36. Accordingly, as shown in FIG. 10, time-series data about a difference value (second differential torque) TD2 is calculated (Step S21). The relationship among the differential torque TD1, the reference torque TR, and the difference value TD2 is as shown in FIG. 11, for example.

Then, the determination unit 34 determines whether the absolute value of the average value of the difference value TD2 exceeds a predetermined threshold Th3, for example (Step S22). In the case where the absolute value of the average value of the difference value TD2 exceeds the threshold Th3, the determination unit 34 determines that there is a problem at any of the bearings 20, 24, and 28 in the speed reduction mechanism 10 or with a lubricant, and the determination result is reported by the notification unit 35 (Step S23).

The differential torque TD1 indicates a resistance component, in the speed reduction mechanism 10, that is obtained by subtracting the actual torque Ts from the ideal torque Ti, and fluctuates depending on the amounts of preloads for the bearings 20, 24, and 28 and the state of the lubricant.

The difference value TD2 is obtained by subtracting the reference torque TR from the differential torque TD1 and indicates how the current differential torque TD1 has changed with respect to that in the normal state of the robot 2.

Even when the differential torque TD1 contains an offset or a vibration inherent to each of the rotary joints J1, J2, J3, J4, J5, and J6, if that is normal, that can be removed by subtracting the reference torque TR from the differential torque TD1. Therefore, there is an advantage in that a change from the normal state can be accurately extracted, and whether there is a possibility of a problem can be accurately determined.

In the case where the average value of the difference value TD2 is negative, there is a possibility of a problem, such as a reduction in the amounts of preloads for the bearings 20, 24, and 28 due to wear, softening of a grease serving as a lubricant due to deterioration, or a reduction in tension of a belt if the belt is included in the speed reduction mechanism 10.

On the other hand, in the case where the average value of the difference value TD2 is positive, the following possibilities are conceivable. That is, there is a possibility of a problem, such as clogging up of the bearing 20, 24, or 28 with wear debris of a mechanism component of the corresponding bearing 20, 24, or 28 due to deterioration of the grease serving as a lubricant, clogging up of the bearing 20, 24, or 28 with broken pieces of a mechanism component of the gear 17, 18, 21, 22, 25, or 26, or hardening of the grease due to wear debris.

According to this embodiment, there is an advantage in that it is possible to report, in addition to a problem at each of the gears 17, 18, 21, 22, 25, and 26 of corresponding one of the speed-reduction elements 14, 15, and 16 in the first embodiment, a problem occurring at any of the bearings 20, 24, and 28 or with the lubricant in the speed reduction mechanism 10. There is an advantage in that it is possible to improve the rigidity and rotational accuracy of the rotary joints J1, J2, J3, J4, J5, and J6 through adjustment of preloads for the bearings 20, 24, and 28. Furthermore, in the case where there is a possibility of a problem with the lubricant, the lubricant is replaced, thereby making it possible to repair the problem without replacing the other mechanism components and to significantly reduce the man-hours and the costs required for maintenance.

Note that, in this embodiment, the possibility of a problem at any of the bearings 20, 24, and 28 or with the lubricant is reported depending on whether the absolute value of the average value of the difference value TD2 is larger than the predetermined threshold Th3. Instead of this, it is also possible that the content of a problem is further divided into details by using reference symbols for the average value of the difference value TD2 and is reported.

Furthermore, in this embodiment, the determination unit 34 determines the possibility of a problem by using the absolute value of the average value of the difference value TD2. Instead of this, it is also possible to extract time-series data about the difference value TD2 in a time period for beginning of movement of each of the rotary joints J1, J2, J3, J4, J5, and J6 and a time period for constant-speed operation of each of the rotary joints J1, J2, J3, J4, J5, and J6, on the basis of the time-series data about the difference value TD2 calculated in Step S21 and the stored time-series data about the rotation angle value.

Then, the possibility of a problem may be determined by using the extracted difference value TD2 in each of the time periods. Specifically, the maximum value of the difference value TD2 in the time period for beginning of movement of each of the rotary joints J1, J2, J3, J4, J5, and J6 is a non-periodic component and corresponds to a resistance component due to static friction of the mechanism components. In the case where the absolute value of the maximum value of the difference value TD2 in the time period for beginning of movement of each of the rotary joints J1, J2, J3, J4, J5, and J6 exceeds the predetermined threshold Th3, it is found that the amounts of preloads for the bearings 20, 24, and 28 are too large.

Furthermore, the average value of the difference value TD2 in the time period for constant-speed operation of each of the rotary joints J1, J2, J3, J4, J5, and J6 is also a non-periodic component and corresponds to a resistance component due to kinetic friction of the mechanism components. In the case where the absolute value of the average value of the difference value TD2 in the time period for constant-speed operation of each of the rotary joints J1, J2, J3, J4, J5, and J6 exceeds the predetermined threshold Th3, it is found that the lubricant has hardened or softened due to deterioration.

Furthermore, the time-series data about the difference value TD2 in the time period for constant-speed operation of each of the rotary joints J1, J2, J3, J4, J5, and J6 may also be used to extract the frequency in Step S9. Accordingly, the frequency of a periodic component contained in the differential torque TD1 can be obtained more accurately than a case in which the time-series data about the differential torque TD1 in the whole time period for operation of each of the rotary joints J1, J2, J3, J4, J5, and J6 is used.

Furthermore, in this embodiment, the difference value TD2 is calculated by subtracting the time-series data about the reference torque TR from the time-series data about the differential torque TD1. Since the reference torque TR is the differential torque TD1 measured by executing the diagnostic program under a predetermined condition at the time of shipment of the robot 2 or other opportunities, for example, it is preferable to conduct a diagnosis at a job site under the same condition as that at the time of shipment.

However, for example, it is difficult to set the temperature of the speed reduction mechanism 10 when a diagnosis is made, to the temperature at the time of shipment. Therefore, it is preferred that a temperature sensor capable of detecting the temperature of the speed reduction mechanism 10 is included and that the determination unit 34 includes a correction unit for correcting the time-series data about the reference torque TR with the temperature detected by the temperature sensor. Furthermore, it is also possible to use the temperature detected by a temperature sensor that is included in the torque sensor 11, for example, instead of the temperature sensor that directly detects the temperature of the speed reduction mechanism 10.

Furthermore, as the operation of the robot 2 when a diagnosis is conducted at the job site, performing the same operation as a diagnosis operation performed at the time of shipment is not realistic. Then, the storage unit 36 may store the time-series data about the reference torque TR, and the time-series data about the rotation angle value when the reference torque TR is measured. Then, at the time of a diagnosis, the reference torque TR may be corrected by using the speed and the acceleration of each of the rotary joints J1, J2, J3, J4, J5, and J6 obtained from the rotation angle value detected in every moment by the encoder 13 included in the corresponding one of the rotary joints J1, J2, J3, J4, J5, and J6, to generate the time-series data about the reference torque TR with respect to an operation performed at the time of the diagnosis.

Furthermore, in this embodiment, the time-series data about the difference value TD2 in the time period for beginning of movement of each of the rotary joints J1, J2, J3, J4, J5, and J6 and the time period for constant-speed operation of each of the rotary joints J1, J2, J3, J4, J5, and J6 is extracted, thereby using the resistance components due to the static friction and the kinetic friction to determine a problem. Instead of this, the resistance components due to the static friction and the kinetic friction may be used to measure smoothness of rotation of the speed reduction mechanism 10. Since a change in the internal resistance of the speed reduction mechanism 10 is found, it is also possible to estimate a lubrication state and the states of fluctuations of the axes of the gears 17, 18, 21, 22, 25, and 26, and the bearings 20, 24, and 28 due to wear. Furthermore, if a belt is included in the speed reduction mechanism 10, the tension of the belt can also be estimated.

Furthermore, in this embodiment, the time-series data about the difference value TD2 in the time period for beginning of movement of each of the rotary joints J1, J2, J3, J4, J5, and J6 and the time period for constant-speed operation of each of the rotary joints J1, J2, J3, J4, J5, and J6 is extracted from the time-series data about the difference value TD2 calculated using the actual torque Is measured by means of the torque sensor 11. Instead of this, it is also possible to mount another encoder at the output location of each speed reduction mechanism 10 and to obtain the time period for beginning of movement of each of the rotary joints J1, J2, J3, J4, J5, and J6 and the time period for constant-speed operation of each of the rotary joints J1, J2, J3, J4, J5, and J6.

Furthermore, it is also possible to adopt a force sensor instead of the torque sensor 11 mounted at the output location of the speed reduction mechanism 10 of each of the rotary joints J1, J2, J3, J4, J5, and J6.

Next, a robot system according to a third embodiment of the present invention will be described below with reference to the drawings.

In a description of this embodiment, identical reference signs are assigned to portions that have the configurations common to those of the robot systems 1 of the above-described first embodiment and second embodiment, and a description thereof will be omitted.

In the robot system of this embodiment, the same diagnosis as that on the robot 2 according to the first embodiment or the second embodiment is conducted, and, in addition, the presence or absence of a problem in any of the mechanism components included in the speed-reduction elements 14, 15, and 16 of each speed reduction mechanism 10 is reported.

Figure 12:
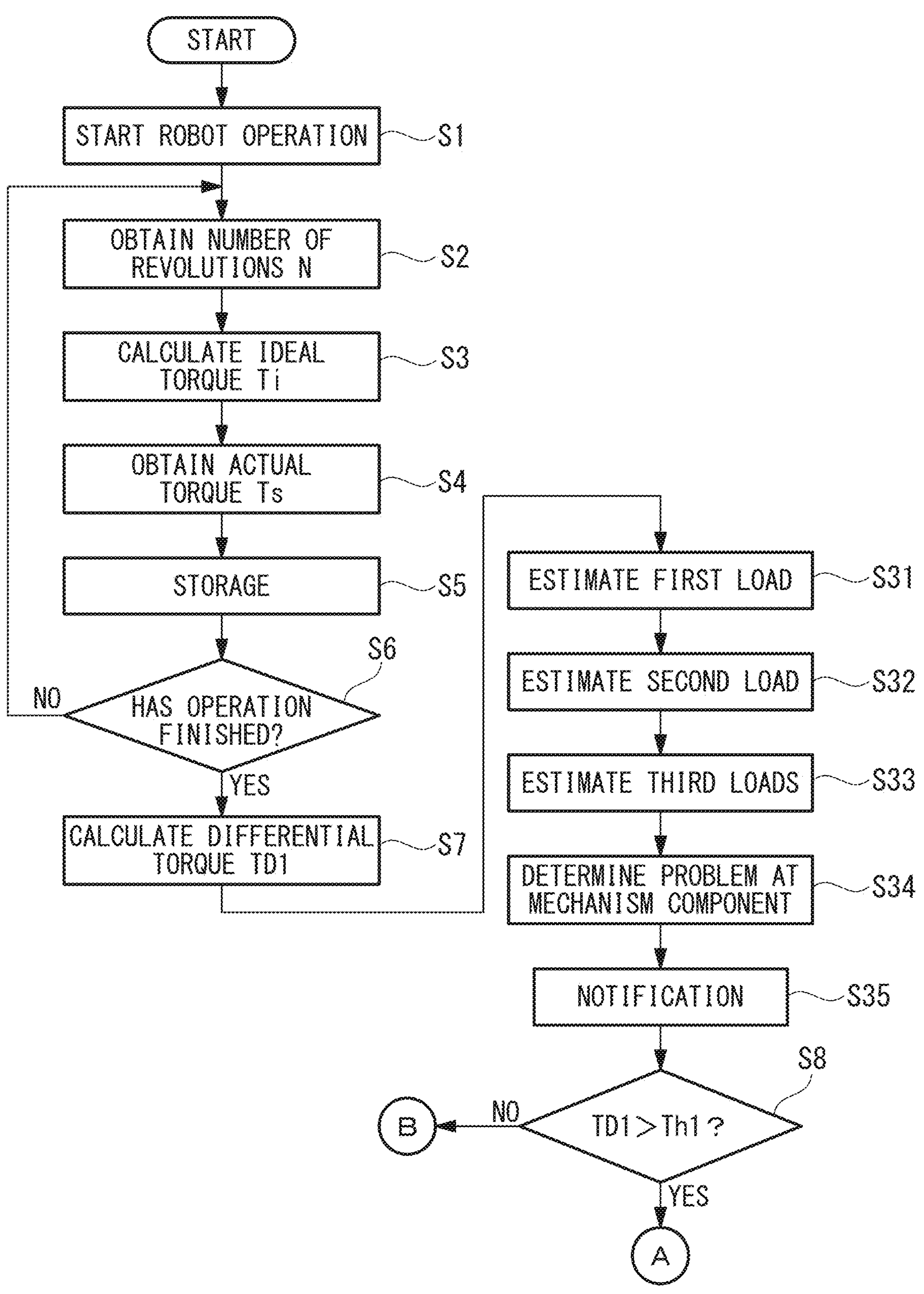
FIG. 12 is a flowchart for explaining a diagnostic method in a robot system according to a third embodiment of the present disclosure.

In FIG. 12, although an example case in which a diagnosis is made by the robot system of this embodiment during a diagnosis made by the robot system 1 of the first embodiment is illustrated, those diagnoses may be made in parallel or alternately.

In the robot system of this embodiment, the control device 3 includes the storage unit 36, which is connected to the determination unit 34, as in the second embodiment shown in FIG. 9. The storage unit 36 stores main dimensions of the individual link members (the swivel body 5, the first arm 6, the second arm 7, and the wrist unit 8), which constitute the robot 2, and the output location (the coordinates of the center position of the output flange 29) of each speed reduction mechanism 10. Furthermore, the storage unit 36 stores, for each of the mechanism components in each speed reduction mechanism 10, a coefficient for calculating a third load from a second load, to be described later, thresholds for a moment and a force at which the mechanism component is started to be affected, and limit times for which it is allowed to exceed the thresholds.

The coefficient, the thresholds, and the limit times are stored as values corresponding to each of forces Fx, Fy, and Fz in 3-axis, x, y, and z, directions, perpendicular to one another, and each of moments Mx, My, and Mz about the axes. Hereinafter, the forces and the moments in some or all of the total 6-axis directions, described above, are collectively referred to as loads. The directions of three axes, x, y, and z, are set for each speed reduction mechanism 10.

As shown in FIG. 12, after calculating the differential torque TD1 (Step S7), the determination unit 34 estimates a first load applied to the distal end (the center position of a flange surface of a wrist flange) of the wrist unit 8 of the robot 2 (Step S31). At this time, the first load is estimated from the differential torques TD1 at some of the axes of the robot 2.

Next, the determination unit 34 estimates, from the first load, a second load applied to the output location (the center position of the flange surface 29*a* of the output flange 29) of the speed reduction mechanism 10 in each of the rotary joints J1, J2, J3, J4, J5, and J6 (Step S32).

Next, the determination unit 34 estimates, from the second load, third loads applied to the mechanism components constituting the speed reduction mechanism 10, for each of the rotary joints J1, J2, J3, J4, J5, and J6 (Step S33).

The first load to the third loads are estimated as time-series data.

The determination unit 34 determines which mechanism component has a problem, from the time-series data about the third loads on the mechanism components, and the time-series data about the differential torque TD1 calculated in the first embodiment or the second embodiment (Step S34). Then, in the case where it is determined that any of the mechanism components has a problem, the determination result is reported by the notification unit 35 (Step S35).

Figure 13:
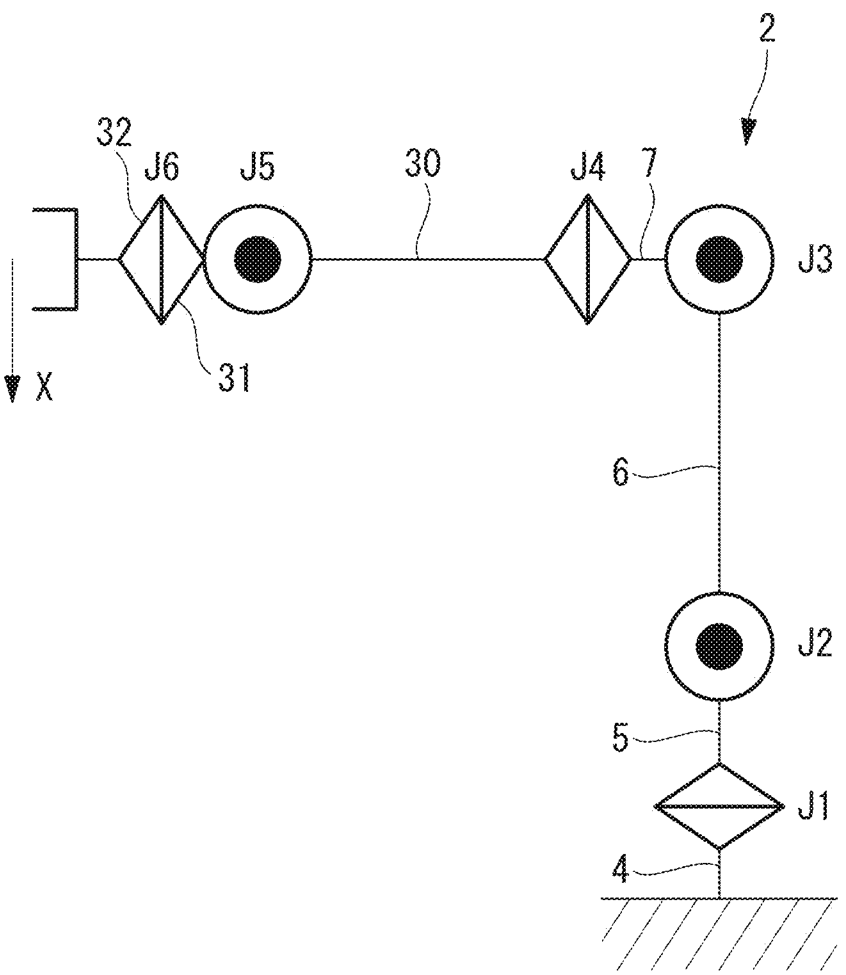
FIG. 13 is a schematic view for explaining the configuration of a robot in the robot system shown in FIG. 12.

A diagnostic method in the robot system of this embodiment will be described below by using an example case in which the robot 2 has a structure shown in FIG. 13 and in which an external force X acts in the direction indicated by an arrow in FIG. 13.

In this case, the first load is estimated on the basis of actual torques Ts that are detected by three torque sensors 11 at the second rotary joint J2, the third rotary joint J3, and the fifth rotary joint J5 (Step S31).

The determination unit 34 calculates the distal-end position of the wrist unit 8 by using a rotation angle value sent from the encoder 13 and the main dimensions of the individual link members (the swivel body 5, the first arm 6, the second arm 7, and the wrist unit 8), and estimates the first load on the basis of the calculated wrist distal-end position, and the output locations of the individual speed reduction mechanisms 10, and the actual torques Ts.

The first load is estimated as (Fx, Fy, Fz, Mx, My, Mz) from the forces in the 3-axis directions perpendicular to one another, and the moments about the axes. The same applies to a case in which other forces and moments act on the robot 2.

Next, the determination unit 34 calculates a coordinate transformation matrix for transforming a coordinate system at the distal end of the wrist unit 8 to a coordinate system at the output location of each speed reduction mechanism 10, and calculates the second load applied to the output location of the speed reduction mechanism 10 by using the calculated coordinate transformation matrix and the first load (Step S32).

Figure 14:
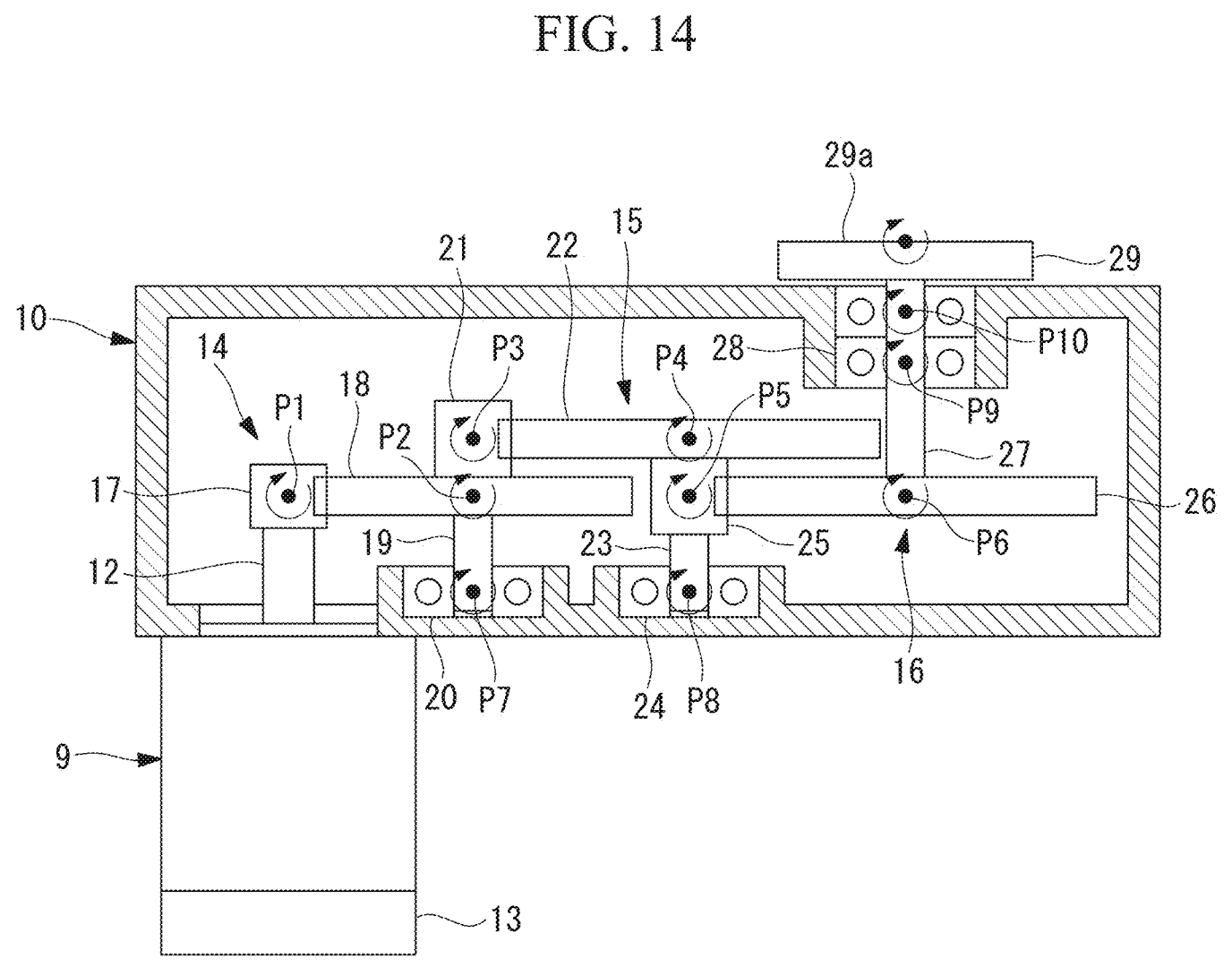

Thereafter, the determination unit 34 multiplies the second load by the coefficients stored in the storage unit 36, to calculate third loads applied to the individual mechanism components, as time-series data (Step S33). For example, as indicated by reference signs P1 to P10 in FIG. 14, the determination unit 34 calculates time-series data about the third loads applied to center positions P1 to P6 of the first gear 17 to the sixth gear 26 and center positions P7 to P10 of the first bearing 20 to the third bearing 28.

In Step S34, the determination unit 34 compares the time-series data about the third loads applied to the individual mechanism components with the time-series data about the differential torque TD1 calculated in Step S7, with the time axes being aligned. Accordingly, the determination unit 34 can determine that there is a possibility of a problem at the mechanism component that fluctuates at the same frequency f as the differential torque TD1.

Furthermore, in Step S34, the determination unit (life estimating unit) 34 accumulates times when the corresponding estimated third load exceeds the thresholds stored in the storage unit 36. Then, the determination unit 34 estimates the remaining life of the corresponding mechanism component on the basis of the cumulative time and the limit times stored in the storage unit 36. Then, the estimated remaining life of the mechanism component is reported by the notification unit 35. Accordingly, the mechanism component at which there is a high possibility of a problem to occur can be externally reported before the problem occurs.

Note that, in this embodiment, the possibility of the occurrence of a problem is determined by comparing the time-series data about the third loads with the time-series data about the differential torque TD1. Instead of this, it is also possible that the time-series data about the third loads obtained for all of the mechanism components is subjected to frequency analysis by FFT or the like, the frequency of a periodic component is extracted, and the mechanism component that has a frequency identical to the frequency of a periodic component in the differential torque TD1 is determined to have a problem.

Furthermore, a mechanism component for which a possibility of a problem is reported in the third embodiment may be reported as additional information that is added to the report of a problem in the first embodiment or the second embodiment. Furthermore, in the case where it is determined that there is a possibility of a problem at a mechanism component, the determination unit 34 may notify the user that the mechanism component should be operated at a speed at which the problem of the mechanism component stands out, or the determination unit 34 may adjust the operation speed of the robot 2.

Furthermore, in this embodiment, the determination unit 34 identifies the mechanism component at which a problem has occurred, by comparing the time-series data about the differential torque TD1 and the time-series data about the third loads applied to the individual mechanism components. Instead of this, the determination unit 34 may include a learned model that is made to learn time-series data about third loads calculated in a state in which the speed reduction mechanisms 10 are normal at the time of shipment or other opportunities. Then, when the robot 2 is operated, time-series data about the calculated third loads at the individual mechanism components is input to the learned model, deviation rates from the third loads in the normal state are calculated for the individual mechanism components, and the mechanism component at which a problem has occurred is identified by using the thresholds etc.

Figure 15:
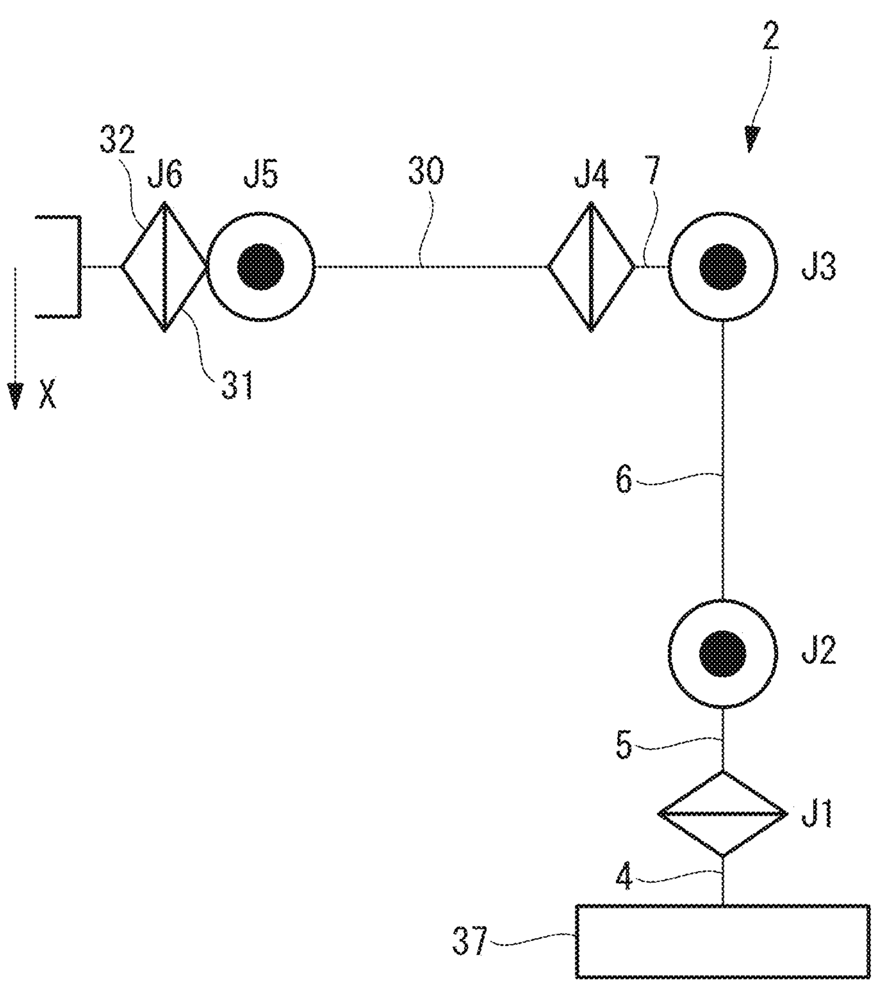
FIG. 15 is a schematic view for explaining a modification of the position of a torque sensor in the robot system shown in FIG. 1.
Figure 16:
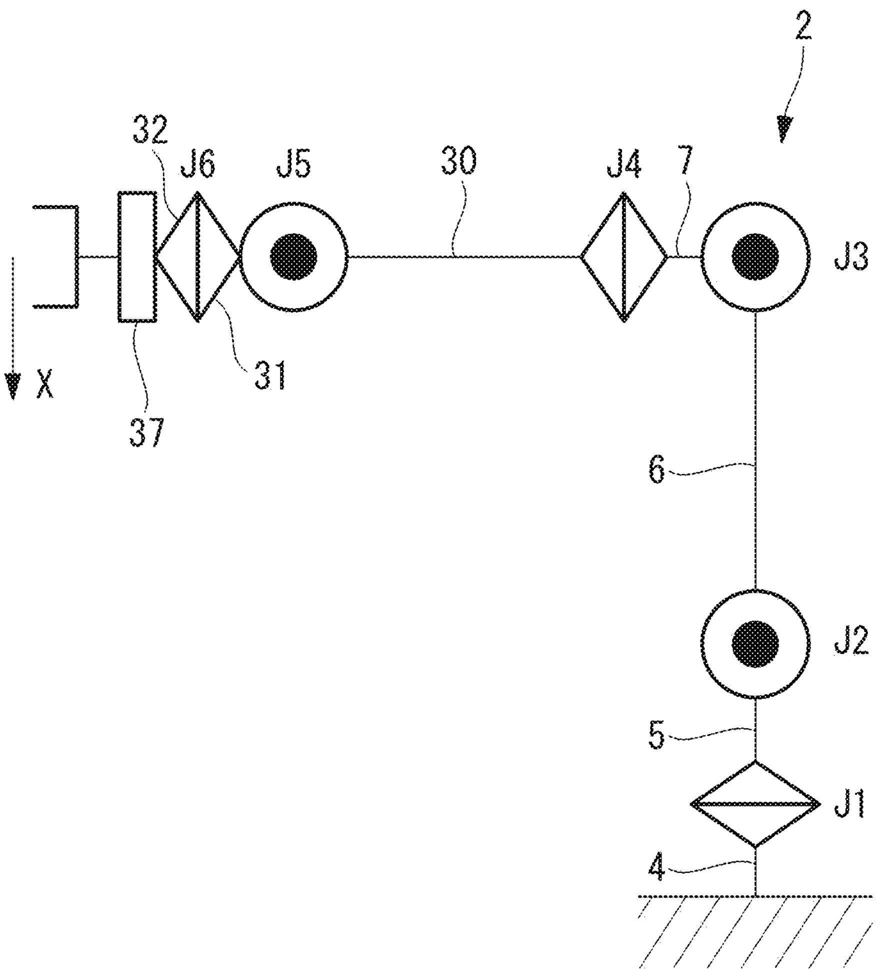
FIG. 16 is a schematic view for explaining another modification of the position of a torque sensor in the robot system shown in FIG. 1.

Furthermore, in each of the above-described embodiments, although an example case in which the torque sensor 11 is included in each of the rotary joints J1, J2, J3, J4, J5, and J6 has been illustrated, a 6-axis force sensor 37 may be disposed between the base 4 and an installation surface, as shown in FIG. 15. Furthermore, as shown in FIG. 16, the force sensor 37 may be disposed at the distal end of the wrist unit 8.

Furthermore, in each of the above-described embodiments, although a vertical 6-axis articulated-type robot that includes the six rotary joints J1, J2, J3, J4, J5, and J6 has been illustrated, instead of this, it is also possible to adopt a robot system that includes a horizontal 4-axis articulated robot, a robot having 7 rotary joints, the number of which is different from 6, or any other type of robot 2. Furthermore, as the joints, linear-motion joints may be included instead of the rotary joints J1, J2, J3, J4, J5, and J6.

The invention claimed is:

1. A robot system, comprising:

a robot that comprises one or more joints; and a control device that is connected to the robot and that comprises at least one processor, wherein the joints each comprise;

a motor;

a speed reduction mechanism that comprises a plurality of speed-reduction elements connected with each other, the plurality of speed-reduction elements including a first speed-reduction element connected to the motor; and a torque sensor that detects, as an actual torque, an output torque of the speed reduction mechanism, wherein the speed reduction mechanism is configured to reduce a speed of revolution of the motor at a plurality of reduction ratios each of which is associated with each of the plurality of speed-reduction elements, and wherein the at least one processor is configured to:

operate the motor by a predetermined current value and obtain the number of revolutions of the motor;

calculate an ideal torque that is an ideal output torque of the speed reduction mechanism when operating the motor by the predetermined current value;

obtain time-series data about a first differential torque that is a difference between time-series data about the ideal torque and time-series data about the actual torque;

extract a frequency of a periodic component contained in the time-series data about the first differential torque; and sequentially compare a value obtained by dividing the number of revolutions by the extracted frequency with each of a plurality of predetermined values determined based on the plurality of reduction ratios so as to identify, of the plurality of speed-reduction elements, a speed-reduction element that has a problem.

2. The robot system according to claim 1, wherein the at least one processor is configured to sequentially determine whether the value obtained by dividing the number of revolutions by the extracted frequency is approximate to any one of the plurality of predetermined values so as to identify, of the plurality of speed-reduction elements, the speed-reduction element that has a problem.

3. The robot system according to claim 1, wherein the control device comprises a memory that stores time-series data about a reference torque that is a difference between the time-series data about the ideal torque and the time-series data about the actual torque at a normal time of the speed reduction mechanism, and the at least one processor is configured to obtain, as the time-series data about the first differential torque, time-series data about a second differential torque that is a difference between the time-series data about the first differential torque and the time-series data about the reference torque.

4. The robot system according to claim 3, further comprising a temperature sensor that detects a temperature of the speed reduction mechanism, wherein the at least one processor is configured to correct the time-series data about the reference torque on the basis of the temperature detected by the temperature sensor.

5. The robot system according to claim 1, wherein the at least one processor is configured to report the speed-reduction element identified to have a problem.

6. The robot system according to claim 1, wherein the at least one processor is configured to determine that a lubricant or a bearing that is included in any of the speed-reduction elements has a problem, when a magnitude of a non-periodic component contained in the first differential torque exceeds a predetermined threshold.

7. The robot system according to claim 1, further comprising an encoder that detects an amount of movement at each of the joints, wherein each of the speed-reduction elements comprises one or more mechanism components, and wherein the at least one processor is configured to:

calculate time-series data about a load applied to each of the mechanism components from time-series data about the amount of movement detected by the encoder and the time-series data about the actual torque; and identify, of the one or more mechanism components, a mechanism component frequency of a periodic component contained in the calculated time-series data about load of which matches the extracted frequency as a mechanism component that has a problem.

8. The robot system according to claim 7, wherein the at least one processor is configured to report the speed-reduction element and the mechanism component identified to have a problem.

9. The robot system according to claim 7, wherein the at least one processor is configured to accumulate times when a load equal to or higher than a predetermined threshold acts, on the basis of time-series data about the load applied to each of the mechanism components and estimate life of each of the mechanism components on the basis of the cumulative time.

10. The robot system according to claim 1, further comprising an encoder that detects an amount of movement at each of the joints, wherein each of the speed-reduction elements comprises one or more mechanism components, wherein the control device comprises a learned model that is made to learn time-series data about a reference load that is a load applied to each of the mechanism components calculated in a normal state of the speed reduction mechanism, and wherein the at least one processor is configured to:

calculate time-series data about the load applied to each of the mechanism components from time-series data about the amount of movement detected by the encoder and the time-series data about the actual torque; and input the calculated time-series data about the load to the learned model and identify, of the one or more mechanism components, a mechanism component that has a problem, on the basis of a deviation rate from the reference load.

11. The robot system according to claim 1, wherein the plurality of predetermined values include 1, a reduction ratio associated with the first speed-reduction element, and a value combining two or more of the plurality of reduction ratios.

* * * * *